United States Patent Office 2,990,373
Patented June 27, 1961

2,990,373
SILOXANE COMPOSITION FOR DAMPING DEVICES
William H. Ragborg, Midland, Mich., assignor to The Dow Corning Corporation, Midland, Mich., a corporation of Michigan
No Drawing. Filed Jan. 3, 1957, Ser. No. 632,276
2 Claims. (Cl. 252—75)

This invention relates to damping devices in which the damping medium is a modified siloxane fluid.

It is well known that organosilicon fluids, particularly the dimethyl organosilicon fluids, are excellent for use in damping applications such as shock absorbers, dashpots and the like. The property which renders these siloxanes especially suitable is the relatively little change in viscosity with temperature. This means that the device will operate substantially the same over wide ranges of temperature thus minimizing inaccuracies due to fluctuations in the viscosity of the damping media.

It is also well known that organopolysiloxanes are much more expensive than hydrocarbon oils or polyesters which are often employed in damping applications. Consequently in spite of the excellent properties of the organosiloxanes their use as damping media has been restricted because of the price. Attempts to dilute the organosiloxanes with mineral oils or other organic oils in order to lessen the price of the damping fluid has not been successful due to the fact that the introduction of the organic oil caused a large change in viscosity of the mixture under shear.

It is the primary object of this invention to provide a siloxane based composition which retains essentially all of the desirable properties of straight siloxane damping fluids and at the same time can be sold at a lower price. Other objects are to provide new and novel damping compositions which are applicable in a wide variety of devices. Other objects and advantages will be apparent from the following description.

This invention relates to a damping device comprising a movable member acting in contact with a fluid composition having a viscosity of less than 1,000,000 cp. at 25° C., said composition consisting essentially of (1) from 45–95% by weight of a methylpolysiloxane fluid containing up to 30 mol percent copolymerized phenylsiloxane, (2) from 5–55% by weight of an oxide of a metal of groups IIB to VIII inclusive of the periodic series of elements and (3) up to 50% by weight of a hydrocarbon oil compatible with (1).

The compositions of this invention are applicable for any type of damping device which includes those which depend upon viscous drag and those which depend upon fluid flow, i.e. where the fluid is forced through a small orifice as in standard shock absorber devices. In all of these devices a movable member is acting in contact with the fluid composition and the latter restrains to some extent the movement of the movable member. Thus, the compositions of this invention are useful in dashpots, shock absorbers for automotive vehicles, aircraft and the like, in the damping of instrumentation, and in recoil mechanisms.

Siloxane (1) employed in the compositions of this invention can be any fluid methylsiloxane which may contain up to 30 mol percent copolymerized phenylsiloxane. The term methylsiloxane as employed herein refers to siloxanes in which all of the organic groups attached to the silicon are methyl. This siloxane can be composed of any combination of monomethyl, dimethyl and trimethylsiloxane units, which combination produces a fluid. The term phenylsiloxane refers to any siloxane having a phenyl group attached to the silicon and in which the remaining groups, if any, are methyl. Specific examples of such phenylsiloxanes are monophenylsiloxane, diphenylsiloxane, triphenylsiloxane, phenylmethylsiloxane, phenyldimethylsiloxane and diphenylmethylsiloxane. As is well konwn, stable fluids generally contain from 1.9 to 3 hydrocarbon groups per silicon. The viscosity of siloxane (1) should be such that the maximum viscosity of the damping composition is less than 1,000,000 cs. There is no critical lower limit to the viscosity of (1).

The metal oxides (2) which are employed herein can be those of any metal from groups IIB through group VIII of the periodic series of elements. Specific examples of operative metallic oxides are magnesium oxide, zinc oxide, cadmium oxide, mercury oxide, aluminum oxide, titanium oxide, zirconium oxide, antimony oxide, bismuth oxide, chromium oxide, tungsten oxide, manganese oxide, iron oxide, nickel oxide and cobalt oxide. The specific amount of metal oxide employed can be varied depending upon the viscosity of the desired product and the particular application to which the material is to be put. A mixture of two or more of the defined oxides can also be employed.

In addition to siloxane fluid (1) and metallic oxide (2) the compositions of this invention may contain up to 50% by weight of a hydrocarbon oil compatible with (1). It has been found that in the presence of the filler (2) a considerable amount of hydrocarbon oil can be added to the compositions of this invention thereby further lowering the price thereof. This addition of oil can be done without seriously affecting the desirable temperature-viscosity properties of the resulting mixture and without causing a breakdown of the mixture under shear.

For the purpose of this invention any hydrocarbon oil which is compatible with siloxane (1) can be employed. In general, although there are exceptions, it has been found that the lower viscosity oils (that is in the range of 10 SAE or less) are more compatible than the higher viscosity materials.

The mixtures of this invention are prepared by merely mixing the siloxane, filler and, if desired, a hydrocarbon oil and stirring vigorously to disperse the filler. No serious separation of the oxide occurs on standing.

The following examples are illustrative only and should not be construed as limited the invention which is properly delineated in the appended claims. In the specification and claims all percentages are based on the total weight of the damping fluid.

*Example 1*

A mixture of 25% by weight of $TiO_2$ and 75% by weight of a trimethyl endblocked dimethylpolysiloxane fluid having a viscosity of 100,000 cs. was prepared by agitating the mixture until an even dispersion of the $TiO_2$ was obtained. The resulting mixture had a Brookfield viscosity of 247,000 cp. This mixture had better temperature-viscosity properties than the original siloxane as measured on a Brookfield viscometer. It also had excellent thermal conductivity. These properties show that this fluid would be suitable for damping in shock absorbers.

*Example 2*

A mixture of 50% by weight of a 60,000 cs. trimethyl endblocked dimethylpolysiloxane fluid, 20% by weight of a hydrocarbon oil having a viscosity of about 20 cs. sold under the name Shell Tegulla No. 11 and 30% by weight of $TiO_2$ was prepared by agitating the mixture until a uniform dispersion of the filler was obtained. The resulting mixture had a Brookfield viscosity of 45,000 cp. This material was operated in a shock absorber and was shown to be satisfactory.

*Example 3*

A mixture of 50% by weight of 350 cs. trimethyl endblocked dimethylpolysiloxane fluid and 50% by weight of TiO$_2$ was prepared. This mixture showed by its properties that it was suitable for use as a damping fluid.

*Example 4*

A mixture of 30% by weight of ferric oxide, 20% by weight of a highly refined white hydrocarbon oil sold under the name XCT White Oil and 50% by weight of a 60,000 cs. trimethyl endblocked dimethyl polysiloxane fluid was prepared. The properties of this mixture showed that it was operable in the shock absorber of Example 2.

*Example 5*

Equivalent results are obtained when zinc oxide, aluminum oxide, antimony oxide, tungsten oxide and manganese oxide are substituted in the composition of Example 2.

*Example 6*

Equivalent results are obtained when a 10,000 cs. copolymer of 80 mol percent dimethylsiloxane and 20 mol percent phenylmethylsiloxane is substituted in the composition of Example 2.

That which is claimed is:

1. A fluid composition having a viscosity of less than 1,000,000 cp. at 25° C. suitable for use in damping devices, said composition consisting essentially of (1) from 45 to 95 percent by weight of a methylpolysiloxane fluid containing up to 30 mol. percent copolymerized phenylsiloxane, (2) from 5 to 55 percent by weight of an oxide of a metal selected from the group consisting of magnesium, zinc, cadmium, mercury, aluminum, titanium, zirconium, antimony, bismuth, chromium, tungsten, manganese, iron, nickel and cobalt and (3) up to 50 percent by weight of a hydrocarbon oil compatible with (1).

2. The fluid composition of claim 1 wherein (2) is titanium dioxide.

References Cited in the file of this patent

UNITED STATES PATENTS

| | | |
|---|---|---|
| 2,449,335 | Sowa | Sept. 14, 1948 |
| 2,460,116 | Bazley | Jan. 25, 1949 |
| 2,467,178 | Zimmer et al. | Apr. 12, 1949 |
| 2,468,869 | Daudt | May 3, 1949 |
| 2,495,363 | Gilkey | Jan. 4, 1950 |
| 2,584,334 | Fano | Feb. 5, 1952 |
| 2,631,690 | Dunham | Mar. 17, 1953 |
| 2,645,588 | Barry | July 14, 1953 |
| 2,677,658 | Bidaud | May 4, 1954 |
| 2,702,793 | Smith | Feb. 22, 1955 |
| 2,726,213 | Fano | Dec. 6, 1955 |
| 2,742,031 | Tauscheck | Apr. 17, 1956 |
| 2,768,955 | Heisig | Oct. 30, 1956 |

OTHER REFERENCES

"Product Engineering," January 1950, pp. 90–93.